UNITED STATES PATENT OFFICE.

JAMES T. McDOUGALL, OF SAN FRANCISCO, CALIFORNIA.

IMPROVEMENT IN REDUCING ORES OF COPPER AND SILVER.

Specification forming part of Letters Patent No. 42,100, dated March 29, 1864.

*To all whom it may concern:*

Be it known that I, JAMES T. MCDOUGALL, of the city and county of San Francisco, State of California, have invented a new and Improved Method of Reducing the Ores of Copper and Silver; and I do hereby declare that the following is a full and exact description thereof.

The nature of my invention consists in smelting the ores in conjunction with a fusible hydrous silicate of alumina, whereby I am enabled to desulphurate the mineral at a full red heat without slagging or agglomeration, and by continuing my process and raising the temperature to a white heat the ore is reduced to the metallic state by reason of contact with the superheated steam given off from the decomposing silicates, and is precipitated to the bottom of the fluid mass by reason of its specific gravity, where it is completely protected from reoxidation by its covering of fluid flux.

To enable others skilled in the art to use my invention, I will proceed to describe my mode of reduction.

I use the ore and flux in proportions varying according to the nature of the gangue of the ore to be reduced, some ores requiring only one-tenth, while others require nearly one-half their weight of flux. I recommend a thorough and intimate mixture of the ore and silicate before heating.

I use any kind of furnace for the reduction in which sufficient heat can be obtained and that has a depressed sole or crucible hearth for the collection of the reduced metal.

The first part of my process is raising the temperature of the contents of my furnace to a cherry-red heat, which I continue until the ores are desulphurated. I then raise the temperature to a full white heat, which I continue sufficiently long to thoroughly fuse the compound and cause the reduced metal to collect at the bottom of the furnace, from whence it is drawn off as desired.

My invention consists, first, in the admixture of the ores of copper and silver with fusible hydrous silicate of alumina, the proportions of the mixture to vary according to the nature of the ore to be reduced; and I claim, secondly, that when the above mixture is placed in a suitable furnace and submitted to a high degree of heat (but a little less than sufficient to melt the silicate) that the ores will be speedily, effectually, and economically separated from all volatile impurities, which in all other methods of reduction are driven off by a long and expensive roasting. I claim, thirdly, that without any change either of furnace or material the process is continued by raising the heat of the furnace to the melting-point of the mixture, at which temperature the silicates are decomposed, giving off the water of combination as superheated steam, which, coming directly in contact with the desulphurated ore, reduces it to a metallic state; and I claim, lastly, that by this my method of reduction that most of the ores of copper and silver can be reduced to a metallic state at one operation and with a great saving of labor, time, and expense; that by reason of the intimate mixture of the ores and silicates a perfect desulphuration is effected at a high temperature without slagging or agglomeration, and that by increasing the heat to the melting-point of the flux the water chemically combined with the silicates is given off as superheated steam, which, coming in contact with the ore at a melting temperature, causes a reduction to the metallic state, while the iron present, if any, is absorbed by the flux, which, forming an upper stratum in the crucible or hearth, completely protects the reduced metal from reoxidation.

I disclaim any right to the discovery of the use of ordinary silicate of alumina made fusible by the addition of metallic or alkaline matter, as sometimes used in metallurgical operations to determine metallic bases.

What I claim as my invention, and desire to secure by Letters Patent, is—

The art of reducing the ores of copper and silver to the metallic state by smelting them in combination or contact with fusible hydrous silicate of alumina.

San Francisco, November 25, 1863.

JAMES T. McDOUGALL.

Witnesses:
B. WILCOCKS,
P. B. FORSTER.